3,143,181
SEISMIC TRANSDUCER AND CUSHIONING
DEVICE THEREFOR
Marvin G. Bays, Graydon L. Brown, and Henry A. Wakefield, Ponca City, Okla., assignors to Continental Oil Company, Ponca City, Okla., a corporation of Delaware
Filed Dec. 6, 1961, Ser. No. 157,388
8 Claims. (Cl. 181—.5)

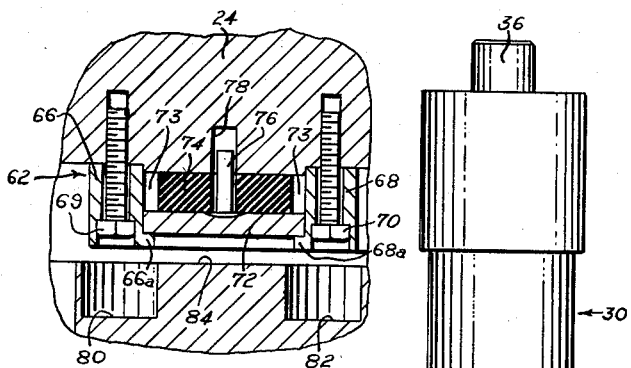

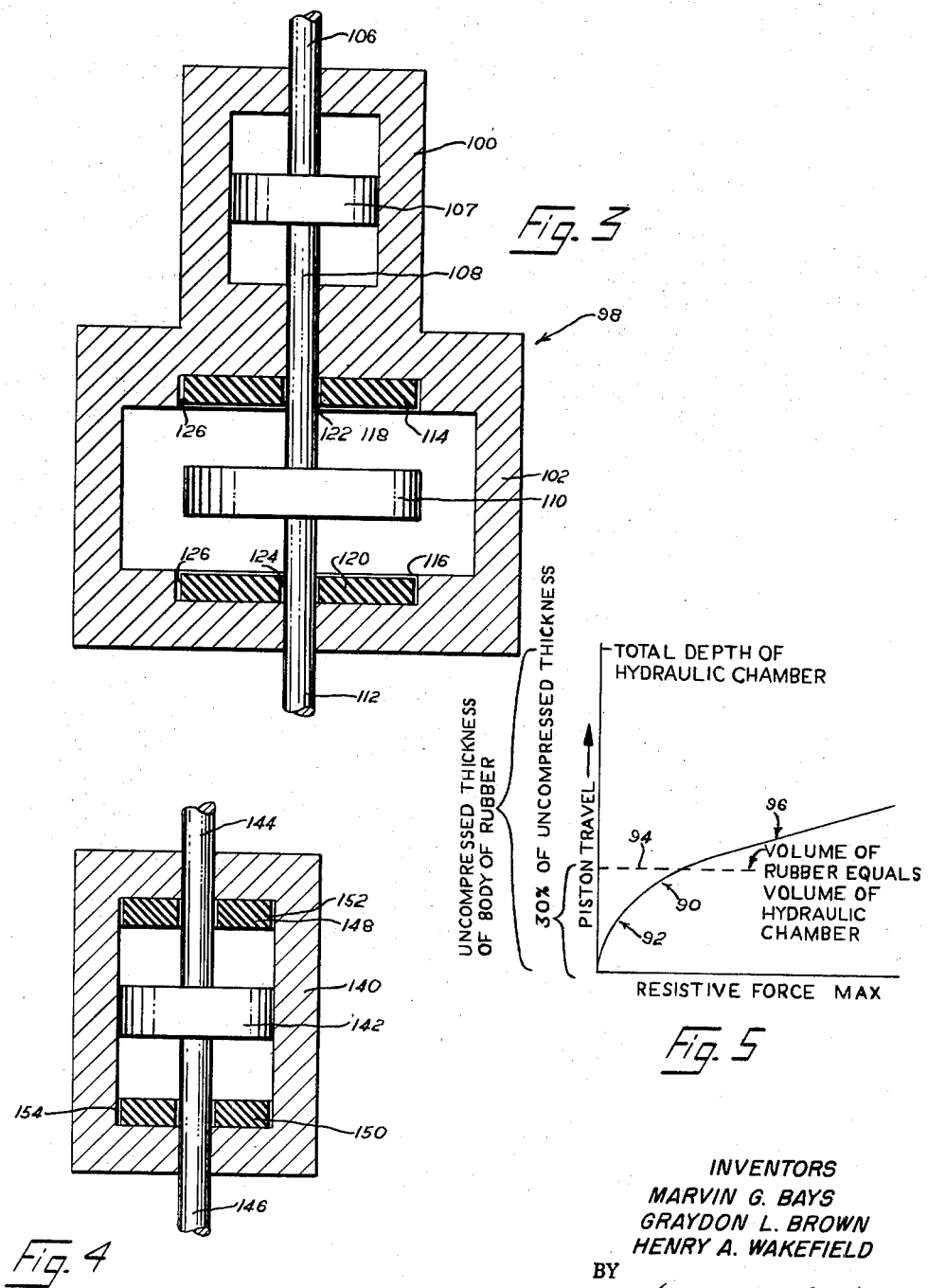

The present invention relates to improved seismic transducers of the reciprocating-mass type used to impart vibratory seismic signals into the earth, and more particularly, but not by way of limitation, relates to a transducer having an improved cushioning means at the design limits of travel of the reciprocating mass.

The oil exploration industry has historically used seismographic surveying methods for mapping subterranean strata in an effort to locate hidden pools of oil. In more recent years, a greatly improved seismographic method has been developed which utilizes a vibratory-type transducer for imparting a controlled, varying frequency seismic signal into the earth instead of the random content signal produced by the more conventional explosive charge. This type of transducer comprises a ground-engaging member and a large mass member which is reciprocated in a vertical direction relative to the ground-engaging member. The mass member is usually reciprocated by a hydraulic linear actuator which interconnects the two members. The reciprocating-mass transducer device may take either of two basic forms in that the piston rod of the linear actuator may be connected to the mass member and the cylinder connected to the ground-engaging member, or the cylinder may be connected to the mass member and the piston rod connected to the ground-engaging member. In either form, the vibrating force imparted to the ground is a result of the force required to decelerate the mass member to a stop at the bottom of the downstroke and then to accelerate the mass member at the beginning of the upstroke, the forces being transmitted to the ground-engaging member and to the ground through the hydraulic fluid of the linear actuator. The weight of a transporting truck is sometimes used to press the ground-engaging platform member against the ground and consequently to absorb the corresponding upward forces of the transducer.

In normal operation of the transducer, reciprocation of the mass at varying frequencies is controlled by electrical circuitry which switches a four-way hydraulic fluid valve in such a manner that the mass member is reciprocated through a very short stroke and is always maintained between the design limits of travel of either the mass member or the piston of the linear actuator. The position of the mass member during reciprocation is monitored by an electronic position-sensing and feedback device which synchronizes the switching of the four-way hydraulic control valve in such a manner to insure that the rigid metal parts of the two members do not come in contact.

However, in the process of starting and stopping the transducer, and frequently in the event of a malfunction of the electronically controlled fluid switching mechanism, either the piston of the linear actuator will impact the ends of the actuator cylinder or the mass member will impact the housing in which it is reciprocated, depending upon the design of the particular transducer. Unless the tremendous impact force between the two impacting members is cushioned and absorbed by some suitable device, the transducer would quickly be destroyed.

The prior art is replete with various types of shock-absorbing and cushioning devices. However, by study and experimentation, it was found that none of these devices proved satisfactory or acceptable in the instant application. The prior art devices proved inadequate primarily because of the great magnitude of the force of impact generated by the relative high velocity of the reciprocating-mass member, which may weigh several thousand pounds. Rubber and similar resilient-type shock-absorbing or cushioning devices proved completely inadequate because, as the large forces deformed the rubber, severe internal shear forces were created in the rubber body which caused diagonal shear and actual separation of the body of rubber in a very short time. Hydraulic-type shock-absorbing devices have the inherent problem of containing and controlling the hydraulic fluid and, in addition, when used to resist great force, require precision machining between the cylinder and piston which form the hydraulic compression chamber before the fluid can be subjected to any appreciable compression. Otherwise, the fluid, which is under extremely high pressures, would escape between the parts so that the required great resistive or cushioning force cannot be attained. The high tolerance machining also requires very accurate alignment which is exceedingly difficult and expensive in heavy equipment and which is easily destroyed during rugged field use. Combinations of metallic springs with either rubber or hydraulic fluid are inadequate for substantially the same reasons, and also are considerably more complex and expensive.

It is contemplated by the present invention to provide an improved seismographic transducer for imparting seismic vibration signals to the earth comprising, in combination, a mass member, a ground-engaging member, and a linear actuator interconnecting the two members for reciprocating the mass member vertically relative to the ground-engaging member. The mass member, and that part of the linear actuator connected thereto, of course, has an upper and lower design limit of travel at which point metal will impact metal. An improved compact cushioning means particularly adapted and designed for combination with a seismic transducer is disposed to absorb and cushion the force of impact between the two otherwise impacting rigid metal parts. In the preferred embodiment, the mass member is reciprocated within a housing having upper and lower walls by a piston rod extending through the upper wall and reciprocally journaled in the lower wall. The cushioning means comprises an annular variable volume cushioning chamber connected to each of the upper and lower walls and having a body of rubber disposed therein. The body of rubber has a volume less than the volume of the respective cushioning chamber when the body of rubber is substantially uncompressed. Means are provided on the mass member for reducing the volume of each cushioning chamber as the mass member approaches the corresponding limit of travel, whereby the body of rubber in the cushioning chamber will first be distorted until the volume of the chamber equals the volume of the body of rubber, and then the body of rubber will be subjected to hydraulic or bulk compression in that the rubber will be completely contained on all sides by the chamber walls and will thereafter be uniformly subjected to compression in the same manner as a hydraulic fluid.

Therefore, it is an important object of the present invention to provide an improved seismographic transducer for imparting seismic vibration signals to the earth which is not susceptible to self-destruction upon starting and stopping operation of the device or in the event of a malfunction.

Another important object of the present invention is to provide a seismographic transducer of the type described having a novel combination and arrangement of parts, including a novel cushioning device at the limits of travel of the reciprocating-mass member.

Another very important object of the present invention is to provide an improved compact cushioning device for absorbing the impact force between two otherwise colliding members which is particularly adapted, due to its novel construction, for use in combination with seismographic transducers of the type described.

Another important object of the present invention is to provide a cushioning device which has a long life, is economically constructed because no fluid seals are required to retain a hydraulic fluid, requires no close tolerance machining to establish a hydraulic fluid compression chamber, and requires no precision alignment between the members, which alignment would otherwise be required to form a hydraulic fluid compression chamber.

Additional objects and advantages will be evident from the following detailed description and drawings wherein:

FIGURE 1 is a side elevation, partially in vertical section, of a seismographic transducer constructed in accordance with the present invention.

FIGURE 2 is an enlarged vertical section of a portion of the transducer device of FIG. 1 to better show the details of construction of the novel cushioning device of the present invention.

FIGURE 3 is a schematic vertical section of another embodiment of a seismographic transducer in accordance with the present invention.

FIGURE 4 is a schematic vertical section of still another embodiment of the present invention.

FIGURE 5 is a graph showing the resistive force of the novel cushioning device of the present invention plotted against piston travel, as hereafter described.

Referring now to FIG. 1, a seismographic transducer is indicated generally by the reference numeral 10. The transducer 10 is comprised of a reciprocating-mass member 12 reciprocally disposed in the housing of a ground-engaging member indicated generally by the reference numeral 14. The ground-engaging member 14 has a plate 16 which is pressed against the ground. A cylindrical side wall 18 has a peripheral flange 20 welded around the bottom thereof. The flange 20 is connected to the plate 16 by bolts 22. The housing of the ground-engaging member is completed by the top plate 24 which is circular in shape and is connected to the cylindrical side wall 18 by a plurality of countersunk bolts 26. The circular top plate 24 has a central aperture 28 for receiving the lower rod of a linear actuator 30.

The mass member 12 and the ground-engaging member 14 are interconnected by the hydraulic linear actuator 30 for reciprocating the mass member 12 vertically with respect to the ground-engaging member 14. The linear actuator 30 is comprised of a cylinder 32 having a flange 34 at the lower end. The flange 34 is connected by bolts 35 to the top plate 24 of the ground-engaging member 14. The hydraulic linear actuator 30 has a double-rod-end piston (not shown) reciprocally disposed within the cylinder 32. One piston rod 36 projects from the top head and the other piston rod 38 projects downwardly through the bottom head of the cylinder 32.

The mass member 12 is also cylindrical in shape and has an axial bore 42 for receiving the rod 38. The bore 42 and rod 38 preferably have a spline connection 44 to prevent relative rotation therebetween, and the mass 12 is held in place on the rod 38 by a nut 46 threaded onto the rod 38. The nut 46 securely clamps the mass 12 against the shoulder 48, and a lock nut 50 is provided to prevent vibratory loosening of the nut 46. The bore 42 has an enlarged portion 52 for receiving the nuts 46 and 50. The lower end 53 of the rod 38 is not threaded and is reciprocally journalled in a bearing member 54 to serve as a guide rod for maintaining the reciprocating-mass member 12 in proper alignment within the housing.

A keying device is provided to prevent rotation of the mass member 12, and rod 38 and attached piston of the linear actuator 30. The keying device is comprised of a slot 56 in the side wall 18 and a projection 58 which is slidingly received in the slot and is bolted into a recess in the mass member 12 by bolts 59. A suitable drain plug 60 may be provided in the plate 16 for draining any hydraulic fluid which may leak from the actuator 30 and accumulate in the housing of the ground-engaging member 14.

Upper and lower cushioning devices are indicated generally by the reference numerals 62 and 64, respectively, and are of substantially identical construction. Referring to FIG. 2, which is an enlarged cross-sectional view of one side of the upper cushioning device 62, the walls of an annular cylinder are formed by concentric cylindrical rings 66 and 68, which are bolted to the under face of the top wall 24 by countersunk bolts 69 and 70, respectively. An annular piston 72 is slidingly received between the rings 66 and 68 within the annular cylinder and is retained therein by annular shoulders 66a and 68a. Because of the plasticity of rubber, as hereafter described, the fit between the piston 72 and concentric rings 66 and 68 need not be such as to provide a hydraulic oil or fluidtight seal, but may be only that tolerance which can easily be produced in the average machine shop by standard machining methods. The concentric rings 66 and 68, the top plate 24 and the annular piston 72 form what is herein termed a variable volume, annular cushioning chamber 73.

An annular body of rubber 74 or other similar resilient material is disposed in the annular cushioning chamber 73. The body of rubber 74 has a width less than the distance between the concentric rings 66 and 68 so that the total volume of the body of rubber 74 is less than the total volume of the cushioning chamber 73 when the body of rubber 74 is substantially uncompressed. The thickness of the body of rubber 74 is preferably sufficient to urge the piston 72 outwardly to firmly engage the stop shoulders 66a and 68a and prevent loose play of the piston 72 during operation of the transducer. A plurality of guide pins 76 are circumferentially spaced and connected to the piston 72. The guide pins 76 extend through corresponding bores in the body of rubber 74 and are received in bores 78 in the bottom of the top wall 24. The guide pins 76 maintain the annular piston 72 and the body of rubber 74 properly aligned and prevent malfunction due to displacement of the body of rubber as hereafter described in detail.

The lower cushioning device 64 is substantially identical to the cushioning device 62 but is connected to the top of the plate 16 and faces upwardly. Therefore, the lower cushioning device 64 will not be described in detail, and all reference numbers on the cushioning device 62 may be repeated in connection with the cushioning device 64.

Annular grooves 80 and 82 are cut in the top face of the mass member 12 and are sized and spaced to receive the rings 66 and 68, respectively. The grooves 80 and 82 form an annular projection 84 having a width which will pass between the annular shoulders 66a and 68a so as to engage and actuate the annular piston 72 as hereafter described. Grooves 80 and 82 are provided in the lower face of the mass 12 to form an annular projection 84 which actuates the piston 72 of the lower cushioning device 64 in the same manner.

During normal operation of the transducer 10, the reciprocating-mass member 12 will reciprocate through a relatively short stroke and will be roughly centered between the cushioning devices 62 and 64. However, during starting or stopping of the transducer, or in the event of a malfunction of the hydraulic switching mechanism, the mass member 12 may impact either the upper or lower cushioning devices 62 or 64. In either case, the upper or lower annular projection 84, as the case may be, will pass between the shoulders 66a and 68a and will engage the respective annular piston 72. The piston 72 will then be forced into the annular cushioning chamber 73 to reduce the total volume of the annular cushioning chamber which is formed by the piston 72, the annular rings 66 and 68, and the top plate 24. Simultaneously, the annular body of rubber 74 disposed within the cushioning chamber will be compressed and distorted and will consequently offer a force resisting the movement of the annular piston 72 and further movement of the mass member 12 in accordance with the graphical curve 90 of FIG. 5, which is a plot of the piston travel and therefore the thickness of the body of rubber against the resulting resistive or cushioning force produced. The initial resistive force will be due primarily to internal shear stresses within the rubber and will be nonlinear, as represented by that portion 92 of the curve 90 (see FIG. 5) below the dotted line 94. When the piston 72 has been moved into the annular cylinder a sufficient distance that the body of rubber 74 will have been distorted until it contacts the walls of the rings 66 and 68, the body of rubber will have the same total volume as the total volume of the cushioning chamber 73 and the piston will be at the point of travel represented by the dotted line 94 of FIG. 5. The body of rubber will then be subjected to bulk compression and a much greater resistive force will be produced to resist further movement of the piston 72 and the mass member 12. This resistive force due to bulk compression of the rubber will be substantially linear, as represented by that portion 96 of the curve 90 above the dotted line 94, and in this linear region the curve 96 will have a slope dependent upon the bulk modulus of elasticity of the particular rubber compound from which the body of rubber 74 is fabricated; the greater the bulk modulus, the flatter the slope of the curve.

In FIG. 5, the resistive force created by the body of rubber is plotted from zero to some arbitrary maximum. The piston travel is plotted from zero to the total depth of the cushioning chamber, which in FIGS. 1 and 2 would be the cushioning chamber 73 in the transducer 10. Of course, the depth of the chamber will equal the thickness of the body of rubber.

As the piston travels from the zero penetration point into the cylinder, the body of rubber will be compressed and deformed and will produce the nonlinear portion 92 of the curve 90. As previously mentioned, when the piston travel has reached the point corresponding to the dotted line 94, the total remaining volume of the cushioning chamber 73 is equal to the then total volume of the body of rubber within the chamber, which will, for practical purposes, be equal to the volume of the uncompressed body of rubber. During the nonlinear portion 92, the body of rubber is subjected to relatively great internal shear forces which if increased beyond a certain limit will result in actual shear failure of the body of rubber, usually along a shear face at 45 degrees to the compressing force. However, if the width of the body of rubber is selected so that the point 94 is reached before the internal shear forces become so great as to cause structural failure of the rubber, the body of rubber will then be uniformly subjected to hydraulic or bulk compression which will prevent a further increase in the shear forces. Therefore, the body of rubber is completely contained within the cushioning chamber and is protected from destruction due to internal shear forces.

Experience has shown that, as a general design rule, the uncompressed volume of the body of rubber should be selected, by proper selection of the width of the annular body of rubber, or diameter of the body of rubber as the case may be, with respect to the size of the chamber, so that the degree of piston travel from zero to the dotted line 94 will not exceed thirty percent of the total uncompressed thickness of the body of rubber. If the piston travels into the cylinder more than thirty percent of the total depth, there is danger of creating shear forces of sufficient magnitude to sever the body of rubber.

FIG. 3 schematically illustrates another embodiment of the present invention in which a seismographic transducer 98 has a linear actuator cylinder 100 which is rigidly connected to a cushion housing 102. A double-rod-end piston 107 is reciprocally disposed in the linear actuator cylinder 100. The upper rod 106 of the piston 107 passes through the top cylinder head of the cylinder 100 and may be connected to the electronic position-monitoring and feedback control system for maintaining the travel of the piston 107 and mass structure to which it is attached within the design limits. The lower rod 108 extends through the lower cylinder head and is connected to a second piston 110 which is reciprocally disposed in the cushion housing 102. The rod 108 continues through the piston member 110 and passes out through the bottom of the housing 102 where the extreme lower end 112 is connected to the mass member (not shown) which is to be reciprocated. The housing 102, and therefore the cylinder 100, are connected to the ground-engaging member (not shown). The ground-engaging member may be similar to that shown in FIG. 1 and normally will comprise a plate which rests on the ground and a suitable support or housing structure disposed around the reciprocating-mass member. Therefore, the cylinder 100 and the housing 102 may be considered a part of the ground-engaging member. Similarly, the rod 108 and the two pistons 107 and 110 may be considered a part of the mass member.

Cylinders 114 and 116 are formed in the upper and lower walls of the housing 102 and each is sized to receive the piston 110 in relatively close-fitting sliding engagement so that when the piston 110 is received in either of the cylinders 114 or 116, cushioning chambers will be formed. Disc-shaped bodies of rubber 118 and 120 are disposed in the cylinders 114 and 116, respectively. Each body of rubber has an aperture 122 and 124, respectively, for receiving the rod 108. The bodies of rubber 118 and 120 have a diameter less than the corresponding diameter of the cylinders 114 and 116 so as to provide an annular space 126 and 128, respectively, around the bodies of rubber. Also, the diameters of the apertures 122 and 124 are greater than the diameter of the rod 108. The distance between the cylinders 114 and 116 is such that the piston member 110 will engage the bodies of rubber 118 and 120 before the piston 104 will contact either head of the cylinder 100, or before the mass member will impact either the upper or the lower walls of the housing or support structure within which the mass member may be reciprocated.

Since the overall diameters of the bodies of rubber 118 and 120 are less than those of the respective containing cylinders 114 and 116, the total volume of each of the bodies of rubber 118 and 120 is less than the total volume of the cushioning chamber formed when the piston 110 first contacts the respective body of rubber upon entering the respective cylinder 114 or 116. Therefore, when the transducer device 98 functions abnormally so that the reciprocating mass member and the structure connected thereto begins to reciprocate beyond its safe limits of travel, the piston 110 will enter one of the cylinders 114 or 116 and will impact the respective body of rubber 118 or 120. At first, the respective body of rubber will be compressed and distorted and will offer a resistive force as a result of internal sheer forces set up in the body of rubber. However, when the respective body of rubber has been compressed to such an extent that it fills the cushioning chamber formed by the piston 110 and the respective cylinder 114 or 116, the entire body of rubber will be subjected to bulk compression and will offer a resistive force in accordance with the travel of the piston and the bulk modulus of elasticity of the particular rubber material being compressed. The resulting resistive or cushioning force will correspond to the curve 90 of FIG. 5, which was previously described in connection with FIGS. 1 and 2.

During the time that the particular body of rubber is subjected to bulk compression, the rubber will have a tendency to extrude between the periphery of the piston 110 and the respective cylinder 114 or 116. Similarly, the inner periphery of the rubber will tend to extrude between the rod 108 and the respective journal assembly (not shown) in the housing 102. However, due to the relatively high viscosity of rubber, or, in other words, the high internal shear modulus of the rubber, the sliding fit between the piston 110 and the cylinder 114 need not be anywhere near as accurate as would be required to retain and subject a hydraulic fluid, such as oil, to appreciable bulk compression. In this connection, the ordinary machine shop tolerances on the order of several thousandths of an inch is more than adequate to prevent the rubber 118 from extruding to any destructive extent. After prolonged use, the bodies of rubber used have shown slight abrasion-type wear at the very corners of the bodies of rubber, indicating that a minute portion of the rubber has extruded into the clearance between the piston 110 and the respective cylinder 114 or 116. However, this wear does not affect the operation of the device.

The embodiment of the present invention shown in FIG. 4 is very similar to that shown in FIG. 3 except that the rubber cushioning means are provided inside of a hydraulic linear actuator cylinder 140. In this embodiment, the double-rod-end piston 142 of the linear actuator has an upper rod 144, which may be connected to the electronic position-monitoring system as previously described, and a lower rod 146 which is connected to the mass member (not shown) to be reciprocated. The cylinder 140 is then connected to the ground-engaging member (not shown) by any suitable means. In this case, the piston 142 is continually received in the cylinder 140 in close-fitting sliding engagement, and the fit is sufficiently close to retain even hydraulic oil. Disc-like bodies of rubber 148 and 150 are disposed in opposite ends of the cylinder 140 around the respective piston rods 144 and 146. As in the case of the bodies of rubber 118 and 120 of FIG. 3, the bodies of rubber 148 and 150 have an outer diameter less than the internal diameter of the cylinder 140 to provide annular spaces 152 and 154. Therefore, the total volume of the respective bodies of rubber is less than the total volume of the cylinder 140 occupied by each body of rubber when the respective body of rubber is first contacted by the piston 142.

The operation of the device of FIG. 4 is substantially identical to that of the device of FIG. 3 in that when the piston 142 impacts either of the bodies of rubber, the respective body of rubber will first be compressively distorted and offer a resistive force due to internal shear forces set up by the distortion of the rubber. Then, when the volume of the cushioning chamber formed by the piston 142 and the respective end of the cylinder 140 is equal to the total volume of the respective body of rubber, the rubber will be subjected to bulk compression and offer a much greater resistive force. Once again, the curve 90 of FIG. 5 is representative of the resistive force produced by the action of the body of rubber within the cushioning chamber formed by the piston 142 and the respective end of the cylinder 140.

Having thus described in detail several embodiments of my invention, it will be evident that several novel and inventive features and combinations have been disclosed. For example, in the device of FIGS. 1 and 2, an improved hydraulic transducer is provided which is not subject to self-destruction upon malfunction thereof. The particular annular cushioning device employed is especially adapted for use in seismographic transducers. The annular rings 66 and 68 which form the hydraulic cylinder can easily be machined and bolted to the top plate 24 or the lower plate 16. The annular piston 72 is also easily machined and the aligning pins 76 welded or otherwise connected in place around the piston. The sliding fit between the piston 72 and the rings 66 and 68 need not be so close as to provide a fit for retaining hydraulic oil because of the extremely high viscosity, even when subjected to tremendous pressure, of the body of rubber 74. Since the ring 66 is under equal expansive force around the entire circumference thereof, no particular reinforcing is required other than the tension strength of the ring. Similarly, the ring 68 is placed under uniform radial compression and needs only to be made sufficiently strong to withstand collapse. The piston 72 is, during periods of maximum pressure of the rubber, reinforced by the immediate presence of the annular projection 84 and therefore need not be excessively strong. The piston 72 therefore has a very low mass and does not create a great impact force when contacted by the mass member 12. The annular cushioning devices 62 or 64 need not be aligned with great precision with the annular projections 84 since no hydraulic fit whatever is required between the projection 84 and the rings 66 and 68. No fluid seals are required to maintain a hydraulic fluid in the downwardly facing cushioning chamber of the cushioning device 62. It will also be noted that the annular body of rubber 74 is preferably of such a thickness to urge the piston 72 firmly against the annular shoulders 66a and 68a to prevent excessive rattling during operation of the transducer. Therefore, the intense vibration to which the transducer is subjected during operation does not affect the cushioning devices in the least. The body of rubber 74 is easily given the slight preliminary compression necessary during installation of the bolts 69 and 70 which secure the annular rings 66 and 68 in place. But perhaps the most important advantage of all is the fact that the rubber body 74 can be subjected to virtually unlimited pressure without internal shear failure due to the fact that, before the shear stresses reach the point to cause an internal failure, the entire body of rubber is subjected to a uniform hydraulic or bulk compression. This results not only in being able to absorb an unlimited force, within the mechanical strength of the surrounding steel structure, but also provides a greatly increased service life of the body of rubber 74.

The embodiment disclosed in FIG. 3 may be used with any type reciprocating-mass transducer to achieve the same high performance of the cushioning device shown in FIG. 1. This particular design may be advantageous in instances where the mass being reciprocated is not readily adaptable to the design of the embodiment of FIG. 1. The device of FIG. 4 also has many of the advantages of the transducer of FIG. 1 and has the added advantage over that shown in FIG. 3 of eliminating the housing 102 and the piston 110. The embodiment of FIG. 4 has the advantage that existing transducers may, in most instances, be easily converted to embody the novel cushioning device shown in FIG. 4.

Having thus described various embodiments of our invention in detail, it will be evident that changes and substitutions may be made for the various components in the various combinations without departing from the spirit and scope of our invention as defined by the appended claims.

We claim:

1. A seismographic transducer for imparting seismic vibration signals to the earth comprising, in combination:
   a mass member;
   a ground-engaging member;
   a linear actuator interconnecting the two members for reciprocating the mass member vertically relative to the ground-engaging member with the mass member having upper and lower limits of travel;
   upper and lower cushioning means disposed at the upper and lower limits of travel, respectively, of the mass member, each cushioning means comprising means forming a variable volume cushioning chamber, the volume of the respective cushioning chamber being decreased as a consequence of the mass member approaching the respective limit of travel, a body of rubber in each cushioning chamber, the body of rubber having an uncompressed volume less than the corresponding volume of the cushioning chamber when the body of rubber is uncompressed,
   whereby as the mass member approaches the limits of travel, the respective cushioning chamber will be decreased and the respective body of rubber therein will first be deformed until the volume of the cushioning chamber equals the volume of the body of rubber, and then the body of rubber will be subjected, upon a further decrease in the volume of the cushioning chamber, to bulk compression to thereby cushion the force of impact between the mass member and the housing.

2. A seismographic transducer for imparting seismic vibration signals to the earth comprising, in combination:
a ground-engaging member having a housing with a top wall and a bottom wall;
a mass member reciprocally disposed within the housing;
a hydraulic linear actuator supported on top of the housing having a piston rod depending down into the housing and connected to the mass member for reciprocating the mass vertically;
similar cushioning means disposed between the mass member and the top wall and between the mass member and the bottom wall for absorbing the force of impact therebetween;
each cushioning means comprising a cylinder means, a piston means receivable in the cylinder means to form a variable volume cushioning chamber, and a body of rubber disposed within the cushioning chamber having a volume less than that of the cushioning chamber when the body of rubber is uncompressed;
whereby the force of impact between the mass member and the top or bottom wall of the housing will force the piston means into the cylinder means and the force of impact will be resisted and cushioned first by distortion of the body of rubber to fill the cushioning chamber and then by bulk compression of the body of rubber within the chamber.

3. A seismographic transducer for imparting seismic vibration signals to the earth comprising, in combination:
a ground-engaging member having a housing with a top wall and a bottom wall;
a mass member reciprocally disposed within the housing;
a hydraulic linear actuator supported on top of the housing having a piston rod depending down into the housing and connected to the mass member for reciprocating the mass vertically;
a guide rod extending downward from the mass member and reciprocally journaled in the bottom wall;
first annular cylinder means connected to the lower face of the top wall of the housing and disposed around the piston rod and facing downward;
second annular cylinder means connected to the upper face of the bottom wall and disposed around the guide rod and facing upwardly;
annular piston means slidably disposed in each cylinder means to form an annular cushioning chamber therewith;
means for retaining each of the piston means in each of the cylinder means;
an annular body of rubber in each of the annular cushioning chambers, each body of rubber having an uncompressed volume less than the volume of the respective cushioning chamber when the body of rubber is first contacted by the respective piston means;
and means on the mass member for engaging and moving the respective annular piston means into the respective annular cylinder means before the mass member impacts the top or bottom wall of the housing,
whereby the volume of the respective cushioning chamber will be decreased and the body of rubber will first be deformed until the volume of the cushioning chamber equals the volume of the body of rubber, and then the body of rubber will be subjected, upon further movement of the piston means, to bulk compression to thereby absorb and cushion the force of impact between the mass member and the respective top or bottom wall of the housing.

4. A seismographic transducer for imparting seismic vibration signals to the earth comprising, in combination:
a mass member;
a ground-engaging member;
a linear actuator having a cylinder connected to one of the members and a double-rod-end piston reciprocally disposed in the cylinder with the rods projecting through opposite end walls of the cylinder, one of the rods being connected to the other of the members for reciprocation of the mass member relative to the ground-engaging member;
and an annular body of rubber disposed on each side of the piston around the respective piston rod and abutting the respective end of the cylinder, the body of rubber having a volume less than the volume of the cylinder corresponding to the longitudinal length of the body of rubber,
whereby as the piston approaches the ends of the cylinder, the piston will contact and distort the respective body of rubber until the volume of the body of rubber equals the volume of the chamber formed by the piston and the cylinder, and then the body of rubber will be subjected to bulk compression to thereby absorb the force of impact between the piston and the end of the cylinder.

5. A seismic transducer for imparting vibrations to the earth comprising, in combination:
a mass member;
a ground-engaging member;
a linear actuator having a cylinder connected to one of the members, a double-rod-end piston reciprocally disposed in the cylinder having one of the rods connected to the other member;
a cylinder housing connected to the linear actuator and having opposite end walls having facing open cylinders thereon, one of the piston rods passing through both end walls;
a second piston reciprocally disposed within the cylinder housing, the second piston being alternately received in the facing cylinders to form cushioning chambers therewith, the second piston being connected to the piston rod passing through the cylinder housing.
and an annular body of rubber located on each side of the second piston within each cushioning chamber, the annular bodies of rubber being disposed in the open facing cylinders and having an external diameter less than the internal diameter of the respective open facing cylinders, whereby upon entry of the second piston into the respective facing cylinders the body of rubber will first be deformed until it fills the respective cushioning chamber and then will be subjected to bulk compression to absorb and cushion the force of impact between the second piston and the respective end wall of the cylinder housing.

6. A cushioning device for absorbing the impact force between two otherwise colliding parts comprising:
cylinder means connected to one of the parts and having a longitudinal depth;
a body of rubber within the cylinder means, the body of rubber having a volume less than that volume of the cylinder means corresponding to the longitudinal depth filled by the body of rubber, but said rubber having a volume of at least 70% of said volume of the cylinder means; and
piston means actuated by movement of the other of the two parts for compressively deforming the body of rubber until it fills the cylinder means and then subjecting the body of rubber to bulk compression whereby the impact force between the two colliding parts will be cushioned and absorbed by the body of rubber.

7. A cushion device for absorbing the impact force between two otherwise colliding parts comprising:
cylinder means connected to one of the parts, the cylinder means having a longitudinal axis;
a body of rubber within the cylinder means having a cross-sectional area taken on a plane generally normal to said longitudinal axis about 30% less than the cross-sectional area of the cylinder means taken on the same plane; and
piston means moved responsive to approaching movement between the two parts for compressing the rubber along said longitudinal axis until the rubber deforms to fill the cylinder and for then subjecting the entire body of rubber to bulk compression responsive to further movement of the parts toward collision.

8. In a linearly reciprocating hydraulic motor having a double-rod-end piston reciprocated within a cylinder, the improvement comprising: two bodies of rubber within the cylinder, one disposed at each end thereof on opposite sides of the piston and around each rod, each body of rubber having an outer diameter less than the diameter of the cylinder to provide an annular space between the body of rubber and the cylinder, whereby when the piston approaches the ends of the cylinder, the body of rubber will first be deformed to fill the cylinder and then will be subjected to bulk compression.

References Cited in the file of this patent

UNITED STATES PATENTS

| | | |
|---|---|---|
| 1,463,654 | McNulty | July 31, 1923 |
| 2,100,462 | Wellman | Nov. 30, 1937 |
| 2,683,034 | Seddon | July 6, 1954 |
| 2,712,793 | Holm | July 12, 1955 |
| 2,737,157 | Hefner | Mar. 6, 1956 |
| 2,759,724 | Seddon | Aug. 21, 1956 |
| 2,793,623 | Ludwig et al. | May 28, 1957 |